(12) United States Patent
Kim (10) Patent No.: US 9,465,464 B2
(45) Date of Patent: Oct. 11, 2016

(54) CUSTOM-TAILORED WIDGET PROVIDING DEVICE

(71) Applicant: Soo-Hyun Kim, Bucheon-si (KR)

(72) Inventor: Soo-Hyun Kim, Bucheon-si (KR)

(*) Notice: Subject to any disclaimer, the term of this patent is extended or adjusted under 35 U.S.C. 154(b) by 41 days.

(21) Appl. No.: 14/365,659

(22) PCT Filed: Nov. 2, 2012

(86) PCT No.: PCT/KR2012/009146
§ 371 (c)(1),
(2) Date: Jun. 16, 2014

(87) PCT Pub. No.: WO2013/122305
PCT Pub. Date: Aug. 22, 2013

(65) Prior Publication Data
US 2014/0359107 A1 Dec. 4, 2014

(30) Foreign Application Priority Data
Feb. 16, 2012 (KR) .................. 10-2012-0015821

(51) Int. Cl.
| G06F 3/041 | (2006.01) |
| G06F 9/44 | (2006.01) |
| H04N 21/478 | (2011.01) |
| H04N 21/4782 | (2011.01) |
| G06F 17/30 | (2006.01) |
| H04L 12/24 | (2006.01) |
| H04N 21/488 | (2011.01) |

(52) U.S. Cl.
CPC .............. G06F 3/041 (2013.01); G06F 8/38 (2013.01); G06F 17/30899 (2013.01); H04L 41/24 (2013.01); H04N 21/4782 (2013.01); H04N 21/47815 (2013.01); H04N 21/4882 (2013.01)

(58) Field of Classification Search
USPC .......... 709/223; 345/173; 707/632, 733, 912
See application file for complete search history.

(56) References Cited

U.S. PATENT DOCUMENTS

| 8,595,186 B1* | 11/2013 | Mandyam | ................. G06F 8/38 707/632 |
| 2011/0216026 A1* | 9/2011 | Jeon | ........................ G06F 3/041 345/173 |

FOREIGN PATENT DOCUMENTS

| KR | 20100003115 | 1/2010 |
| KR | 20100003117 | 1/2010 |
| KR | 20100070699 | 6/2010 |
| KR | 20110006305 | 1/2011 |

* cited by examiner

Primary Examiner — Kyung H Shin
(74) Attorney, Agent, or Firm — IPLA P.A.; James E. Bame (57) ABSTRACT

A custom-tailored widget providing device comprises a first widget management unit for receiving registration of information on various kinds of widgets and storing and managing the widget information; a first execution command registration unit for registering execution commands for executing the widgets stored through the first widget management unit; a first open page confirmation unit for selecting, if a browser is displayed on the client of a user, an execution keyword related to a web site opened in the browser; a first widget selection unit for selecting, if the execution keyword of the client is confirmed by the first open page confirmation unit, widgets having an execution command the same as the execution keyword by comparing the execution keyword of the client with the execution commands of the stored widgets; and a first widget display unit for displaying the widgets selected by the first widget selection unit at one side of the client.

8 Claims, 8 Drawing Sheets

CUSTOM-TAILORED WIDGET PROVIDING DEVICE

BACKGROUND OF THE INVENTION

1. Field of the Invention

The present invention relates to a custom-tailored widget providing device for simultaneously outputting widgets related to a program or a web page when the program is executed in a client or the web page is displayed in a browser.

2. Background of the Related Art

Generally, a widget is a small size application program allowing a computer to provide certain information such as weather, time, calendar, calculator or the like or connect to a specific server and request a search or the like using a separate program. Such a widget is used in a variety of terms such as a gadget, a panel and the like.

If a user downloads and installs such a widget or inserts a script in a web page, the widget is displayed on a background screen or the like and may be used at any time.

The widgets are small applications driven in a user terminal, which may easily provide the user with daily life information or media information such as news, weather, clock and the like even without an Internet browser. If the widgets are used, the user may selectively view only desired information in the background screen or the web browser.

The widgets can be classified as web browser-based widgets or installation-type widgets. The web browser-based widgets include widgets operated by "www.igoogle.com", "www.netvibes.com", "www.wzd.com" and the like. If a user connects to a corresponding site, the web browser-based widgets may provide the user with widget services through the corresponding site.

The installation-type widgets include services such as Sidebar of the Microsoft Windows, Gadgets of Google, Yahoo Widgets, Miniple, Daltong and the like. The installation-type widgets are provided in the form of a separate installation program and installed in a client of a user.

There is a problem in that since the widgets work only after a user executes the widgets, the user should inconveniently execute each of the widgets.

SUMMARY OF THE INVENTION

Therefore, the present invention has been made in view of the above problems, and it is an object of the present invention to provide a custom-tailored widget providing device, in which if a web page is displayed in a browser while the device is installed in a client, widgets related to the displayed web page are output together so that a user may use the widgets.

According to another aspect of the present invention, there is provided a custom-tailored widget providing device, in which if a program is executed while the device is installed in a client, widgets related to the program are output together so that a user may use the widgets.

According to still another aspect of the present invention, there is provided a custom-tailored widget providing device, in which if a web page is displayed in a browser of a client while the device communicates with the client, widgets related to the web page are output together so that a user may use the widgets.

According to still another aspect of the present invention, there is provided a custom-tailored widget providing device, in which if a program of a client is executed while the device communicates with the client, widgets related to the program are output together so that a user may use the widgets.

To accomplish the above objects, according to one aspect of the present invention, there is provided a custom-tailored widget providing device installed in a client, the device including: a first widget management unit for receiving registration of information on various kinds of widgets and storing and managing the widget information; a first execution command registration unit for registering execution commands for executing the widgets stored through the first widget management unit; a first open page confirmation unit for selecting, if a browser is displayed on the client of a user, an execution keyword related to a web site opened in the browser; a first widget selection unit for selecting, if the execution keyword of the client is confirmed by the first open page confirmation unit, widgets having an execution command the same as the execution keyword by comparing the execution keyword of the client with the execution commands of the stored widgets; and a first widget display unit for displaying the widgets selected by the first widget selection unit at one side of the client.

Preferably, the stored widget information is registered by a category item classified by a keyword according to a field of using the widgets.

Preferably, as for the execution commands, a site name, a URL or an execution file name is registered as a primary execution command, and a search keyword is registered as a secondary execution command.

Preferably, as for the execution keyword of the first open page confirmation unit, an English or Korean site name or a URL is selected as a primary execution keyword, and a search keyword is selected as a secondary execution keyword, and a most important word selected by analyzing morphemes of a web page in real-time is selected as a tertiary execution keyword.

Preferably, the first widget display unit displays the selected widgets together at one side of a partition by separating the browser into separate partitions or displays the widgets in a toolbar or in a space other than the browser.

Preferably, the widget providing device further includes a first execution program confirmation unit for confirming, if a program is executed in the client of the user, information on the executed program and selecting widgets having an execution command the same as an execution file name of the execution program, and the first widget display unit displays the widgets selected by the first execution program confirmation unit at one side of the client.

According to another aspect of the present invention, there is provided a custom-tailored widget providing device stored in an external server and displaying widgets on a client while communicating with the client, the device including: a second widget management unit for receiving registration of information on various kinds of widgets and storing and managing the widget information; a client management unit for receiving registration of information on a user who desires to use the various kinds of widgets registered in the second widget management unit; an individual widget registration unit for receiving, if the registered user selects a widget registered in the second widget management unit, registration of the selected widget and an execution command for executing the widget; a second open page confirmation unit for selecting, if a browser is displayed on the client of the user, an execution keyword related to a web site opened in the web browser; a second widget selection unit for selecting, if the execution keyword of the client is confirmed by the second open page confirmation unit, widgets having an execution command the same as the execution keyword by comparing the execution keyword of the client with execution commands of the stored widgets; and a second widget display unit for displaying the widgets selected by the second widget selection unit at one side of the client.

DETAILED DESCRIPTION OF THE PREFERRED EMBODIMENT

Hereafter, a custom-tailored widget providing device according to the present invention will be described in detail with reference to the accompanying drawings.

If a browser is displayed or a program is executed while a custom-tailored widget providing device 20 registered with a plurality of widgets according to a first embodiment of the present invention is installed in a wired or wireless client 10 such as a cellular phone, a smart phone, a tablet PC, a computer, a TV or the like, the widget providing device displays related widgets together on the client 10 so that a user of the client may easily use the widgets.

Figure 1:
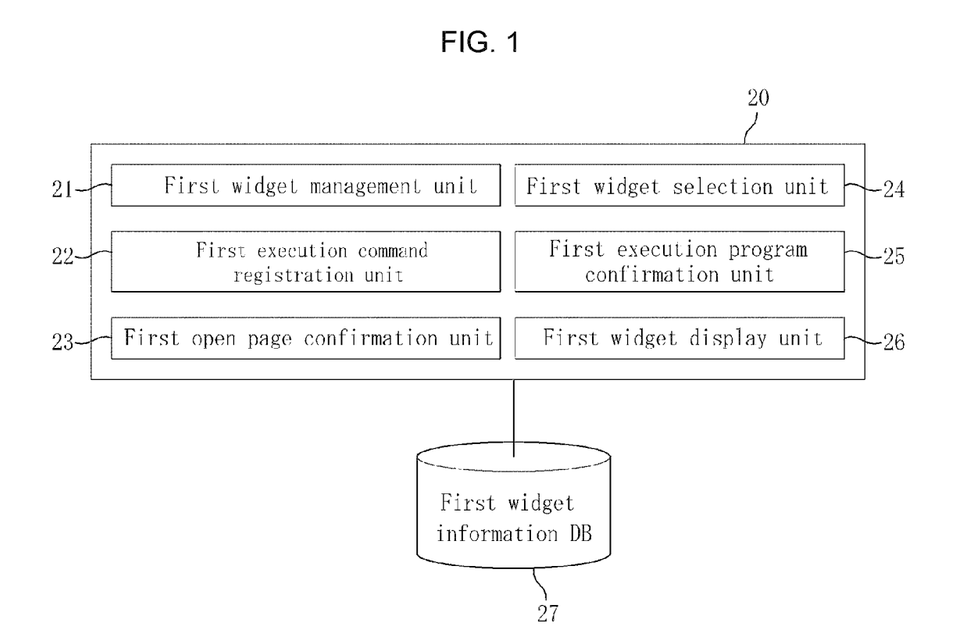
FIG. 1 is a block diagram showing a custom-tailored widget providing device installed in a client according to a first embodiment of the present invention.

As shown in FIG. 1, the widget providing device 20 installed in the client 10 according to a first embodiment of the present invention includes a first widget management unit 21, a first execution command registration unit 22, a first open page confirmation unit 23, a first widget selection unit 24, a first execution program confirmation unit 25 and a first widget display unit 26.

The first widget management unit 21 receives registration of information on a variety of widgets and stores and manages the widget information in a first widget information DB 27. The widget information stored in the first widget information DB 27 is preferably classified and registered by the category item classified according to the field of using the widgets. For example, a price comparison widget, a household account book widget, a calculator widget and the like are registered as shopping items when the category is shopping, a Yahoo dictionary widget, a Naver dictionary widget, a Daum dictionary widget and the like are registered when the category is a dictionary, and widgets related to stocks such as a stock market state widget, an exchange rate widget and the like are registered when the category is stock. In addition, the first widget management unit 21 is provided with newly added widgets while communicating with outside. The widgets registered in the first widget management unit 21 are basically execution commands for executing the widgets. At this point, as for the execution commands, a site name, a URL or an execution file name is registered as a primary execution command, and a search keyword is registered as a secondary execution command. For example, as for the execution commands of the price comparison widget, a household account book widget, a calculator widget and the like related to the shopping, names or URLs of various shopping mall sites are registered as a primary execution command, and a search keyword such as shopping or the like is registered as a secondary execution command. In addition, as for the execution commands of the Yahoo dictionary widget, the Naver dictionary widget, the Daum dictionary widget and the like related to the dictionary, names or URLs of various dictionary sites are registered as a primary execution command, and a search keyword such as dictionary, mini dictionary or the like is registered as a secondary execution command. In addition, as for the execution commands of the stock market state widget, the exchange rate widget and the like related to stock, names or URLs of various stock sites are registered as a primary execution command, and a search keyword such as a stock, an exchange rate or the like is registered as a secondary execution command.

The first execution command registration unit 22 receives registration of the execution commands for executing the widgets stored in the first widget information DB 27 from the user. For example, the user may modify or add the primary execution commands and the secondary execution commands. In addition, if the program executed in the client 10 is a household account book program, the execution file name of the household account book program is registered as a primary execution command of the price comparison widget, the calculator widget, the notepad widget and the like.

If a browser is displayed on the client 10 of the user, the first open page confirmation unit 23 selects an execution keyword related to the web site opened in the browser. As for the execution keyword, an English or Korean site name or a URL is selected as a primary execution keyword, and a search keyword is selected as a secondary execution keyword, and a most important word selected by analyzing morphemes of the web page in real-time may be selected as a tertiary execution keyword. For example, if the 'Auction' site is displayed on the client, site name 'Auction' or 'auction.co.kr'' is selected as a primary execution keyword. Meanwhile, if the primary execution keyword of the web site is not matched to an execution command of a registered widget, the first open page confirmation unit 23 selects a search keyword of the web site as a secondary execution keyword and compares the selected search keyword with the execution commands of the widget, and if the secondary execution keyword of the web site also is not matched to an execution command of a registered widget, the first open page confirmation unit 23 may select a most important word as a tertiary execution keyword by analyzing morphemes of the displayed web page.

If the execution keyword of the client is confirmed by the first open page confirmation unit 23, the first widget selection unit 24 compares the execution keyword of the client with execution commands of the widgets stored in the first widget information DB 27 and selects widgets having an execution command the same as the execution keyword. For example, if the 'Auction' site is displayed on the client, the first widget selection unit 24 selects the price comparison widget, the calculator widget, the notepad widget and the like for which 'Auction' is registered as the execution command.

If a program is executed in the client 10 of the user, the first execution program confirmation unit 25 confirms information on the executed program and selects widgets having an execution command the same as the execution file name of the execution program. For example, if the program executed in the client 10 of the user is a household account book program, a price comparison widget, a calculator widget, a notepad widget and the like for which the execution file name of the household account book program is registered as an execution command are selected.

Figure 2:
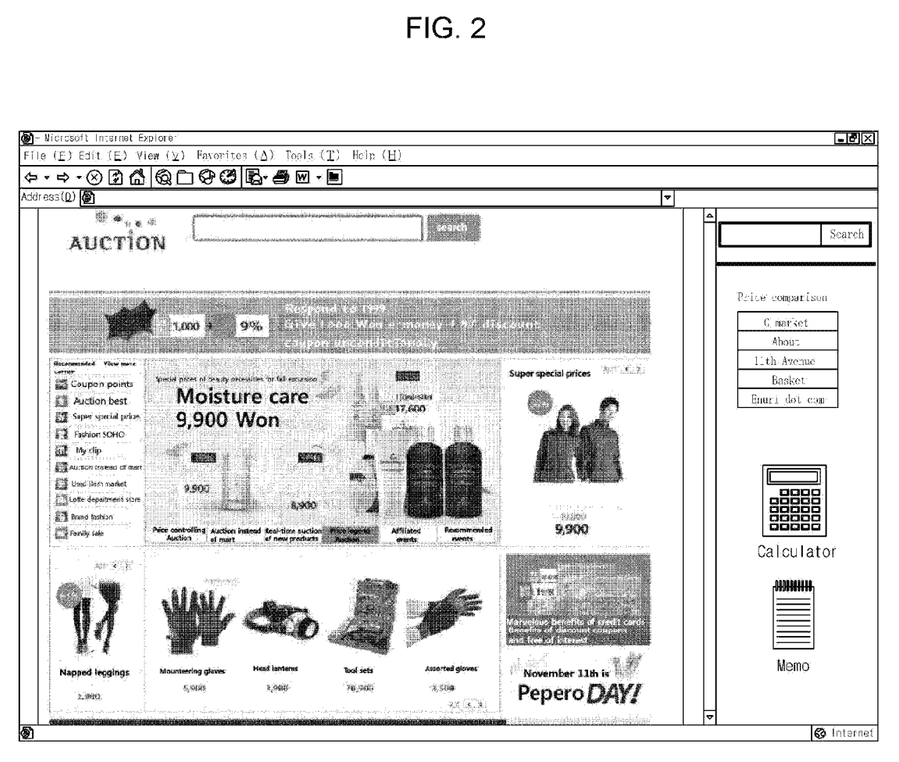
FIGS. 2, 3 and 4 are exemplary views showing a custom-tailored widget providing device according the present invention.
Figure 3:
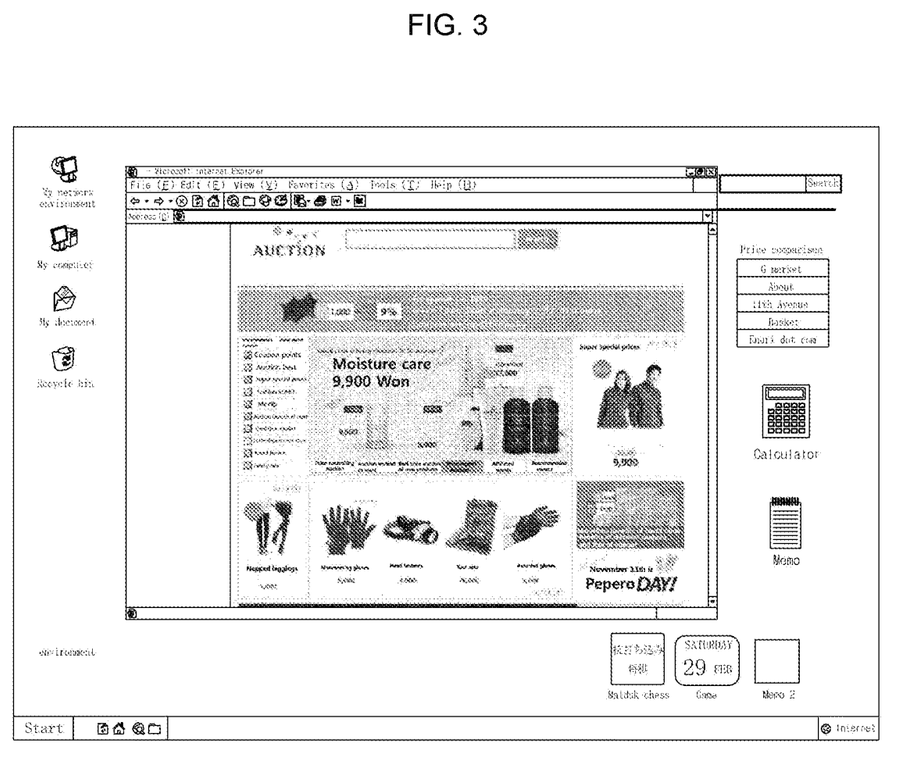
Figure 4:
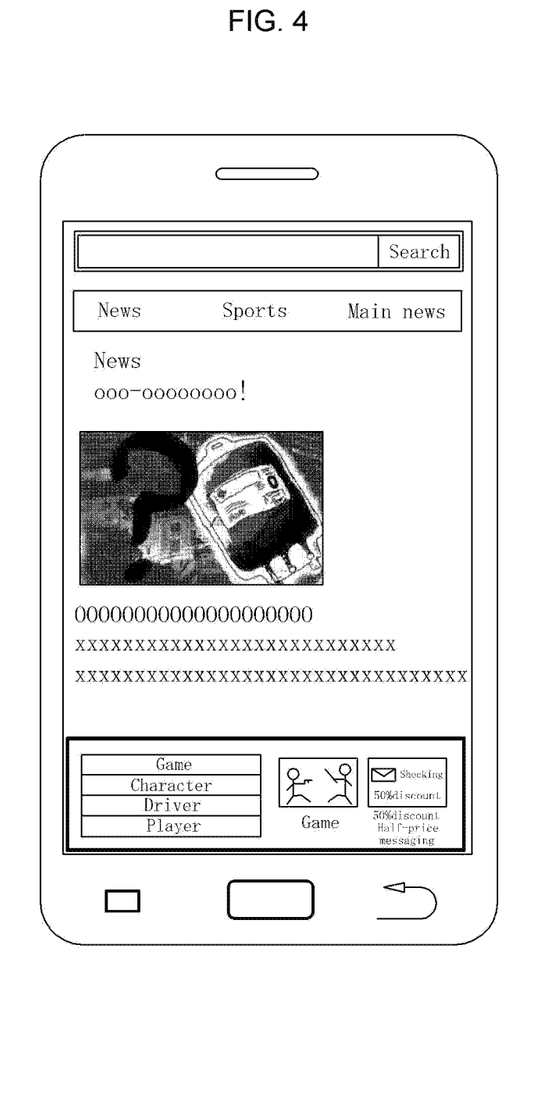

The first widget display unit 26 displays the widgets selected by the first widget selection unit 24 or the widgets selected by the first execution program confirmation unit 25 at one side of the client 10. At this point, the widgets displayed on the client 10 may be displayed together at one side of a partition by separating the browser into separate partitions, may be displayed in a toolbar, or may be displayed in the form of a gadget in a space other than the browser. For example, if the 'Auction' site is displayed on the client 10, widgets related to shopping such as a price comparison widget, a calculator widget, a notepad widget and the like may be displayed in a separated partition of the browser as shown in FIG. 2 or may be displayed on the background screen other than the browser as shown in FIG. 3. In addition, the widgets may be displayed at a lower portion of a cellular phone or a smart phone other than the browser as shown in FIG. 4.

Figure 5:
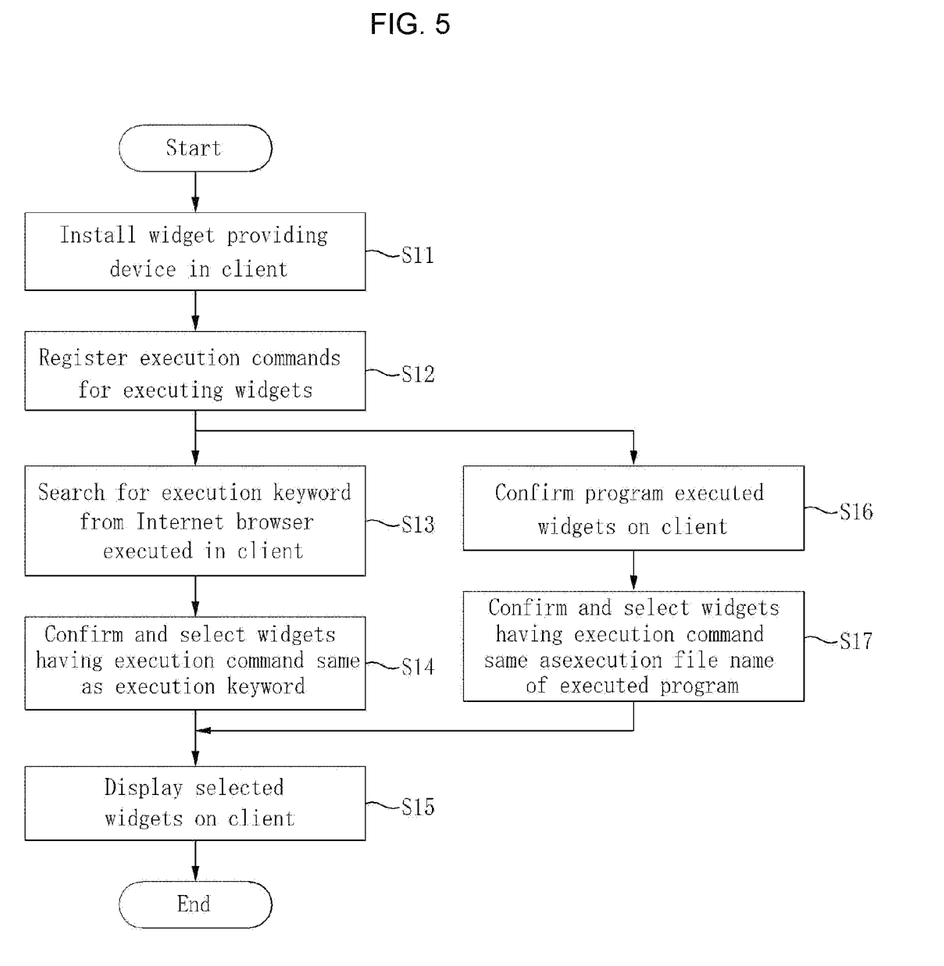
FIG. 5 is a flowchart illustrating a processing flow of a custom-tailored widget providing device installed in a client according to a first embodiment of the present invention.

A processing flow of a custom-tailored widget providing device according to a first embodiment of the present invention will be described in detail with reference to FIG. 5.

First, the widget providing device 20 is downloaded and installed in a wired or wireless client 10 such as a cellular phone, a smart phone, a tablet PC, a computer, a TV or the like by a user or installed as an embedded program (step S11). The first widget management unit 21 of the widget providing device 20 stores various kinds of widgets provided to the user in the first widget information DB 27. The registered widgets are preferably classified by the category item according to the field of using the widgets. The widgets registered in the first widget management unit 21 are basically execution commands for executing the widgets.

The first execution command registration unit 22 receives registration of the execution commands for executing the stored widgets from the user (step S12). Accordingly, the execution commands of the widgets can be modified or added, and an execution file name of a program executed in the client 10 may be registered as an execution command.

Meanwhile, if a browser is executed in the client 10 of the user, the first execution command registration unit 22 searches for an execution keyword by analyzing contents of an executed web page (step S13). For example, as for the execution keyword, an English or Korean site name is selected as a primary execution keyword, and a search keyword is selected as a secondary execution keyword, and, in addition, a most important word selected by analyzing morphemes of the web page in real-time may be selected as a tertiary execution keyword.

If an execution keyword of the web page displayed on the client 10 is selected, the first widget selection unit 24 selects widgets having an execution command corresponding to the keyword (step S14). The first widget display unit 26 displays the widgets having the same keyword registered as an execution command at one side of the client 10 (step S15).

The widgets displayed on the client 10 may be displayed together at one side of a partition by separating the browser into separate partitions, or may be displayed in a toolbar, or may be displayed in a space other than the browser. For example, widgets related to shopping such as a price comparison widget, a household account book widget, a calculator widget, an interested item cart widget and the like are displayed if the 'Auction' site is displayed on the client 10, the Yahoo dictionary, the Naver dictionary, the Daum dictionary and the like are displayed if a dictionary site is displayed, and widgets related to stocks such as a stock market state widget, an exchange rate widget and the like are displayed if a brokerage firm is displayed, and thus the widgets can be used.

Meanwhile, if a specific program is executed in the client 10 of the user (step S16), the first execution program confirmation unit 25 compares the execution file name of the execution program with execution commands of the stored widgets and selects matching widgets (step S17). For example, if the program executed in the client 10 is a household account book program, a price comparison widget, a calculator widget, a notepad widget and the like for which the execution file name of the household account book program is registered as an execution command are selected.

The widgets selected by the first execution program confirmation unit 25 are displayed at one side of the client 10 through the first widget display unit 26 (step S15). At this point, the widgets displayed on the client 10 are preferably displayed in a space other than the browser. Accordingly, if the household account book program is executed in the client, the widgets related to the household account book may be displayed together and used.

Figure 6:
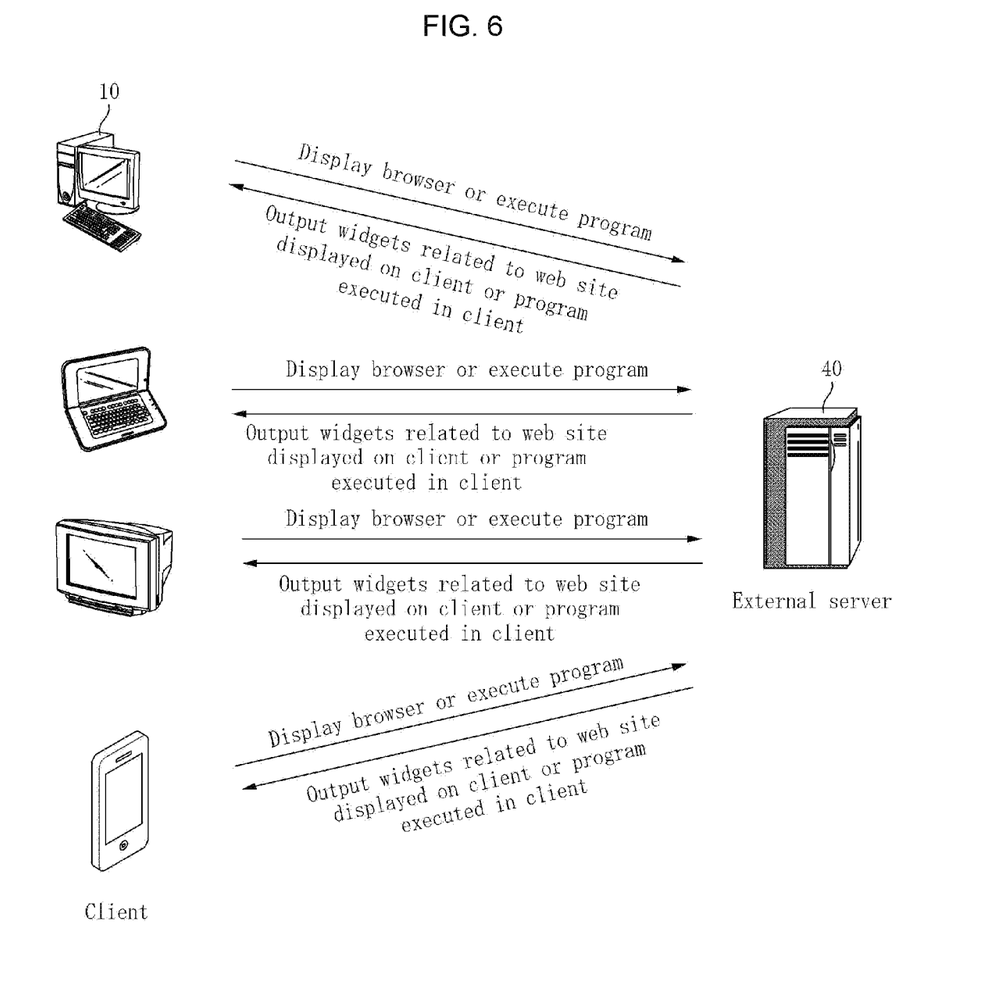
FIG. 6 is a schematic diagram showing a custom-tailored widget providing device installed in an external server and provided to a client according to a second embodiment of the present invention.

In addition, as shown in FIG. 6, a custom-tailored widget providing device 20' registered with a plurality of widgets according to a second embodiment of the present invention is installed in an external server 40 and communicates with a wired or wireless client 10 such as a cellular phone, a smart phone, a tablet PC, a computer, a TV or the like, and if a browser is displayed or a program is executed in the client 10, the widget providing device 20' transmits related widgets to be displayed on the client 10 so that a user of the client may easily use the widgets.

Figure 7:
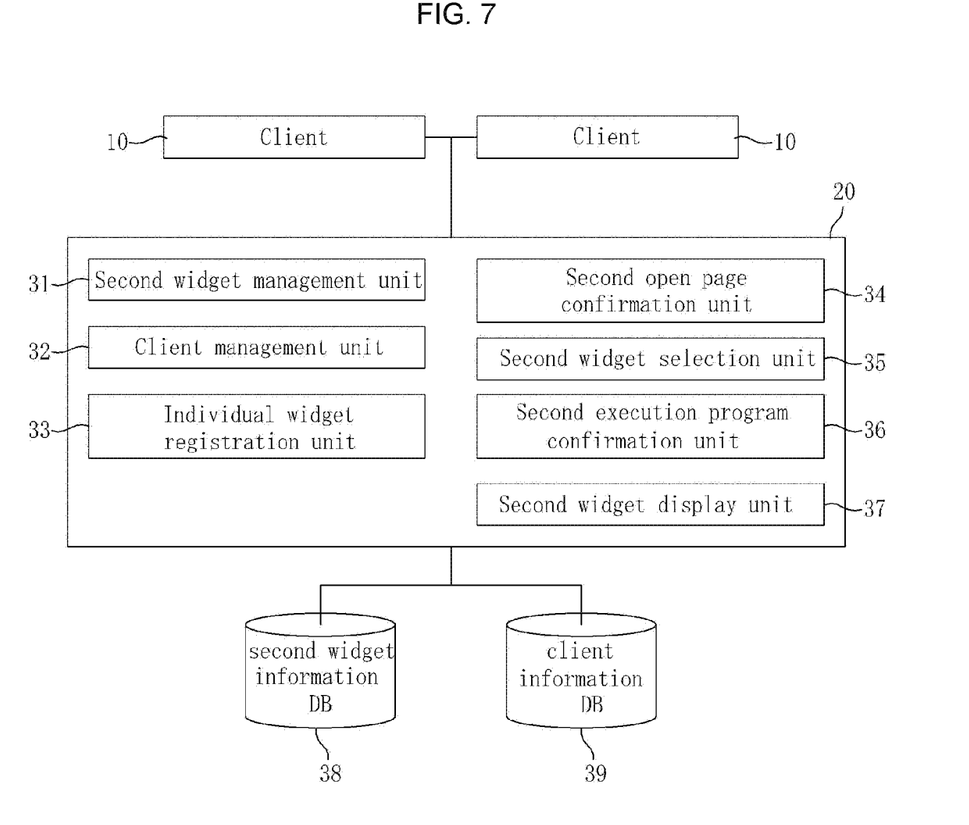
FIG. 7 is a block diagram showing a custom-tailored widget providing device installed in an external server and provided to a client according to a second embodiment of the present invention.

As shown in FIG. 7, the widget providing device 20' according to the present invention includes a second widget management unit 31, a client management unit 32, an individual widget registration unit 33, a second open page confirmation unit 34, a second widget selection unit 35, a second execution program confirmation unit 36 and a second widget display unit 37.

The second widget management unit 31 receives registration of information on a variety of widgets and stores and manages the widget information in a second widget information DB 38. The widget information stored in the second widget information DB 38 is preferably classified and registered by the category item according to the field of using the widgets. The widgets registered in the second widget management unit are basically execution commands for executing the widgets. As for the execution commands, a related site name, URL or execution file name is registered as a primary execution command, and a related search keyword is registered as a secondary execution command.

The client management unit 32 receives registration of information on the client 10 of a user who desires to use the various kinds of widgets registered in the second widget management unit 31 and stores and manages the client information in a client information DB 39. It is preferable that the client management unit 32 automatically registers information on the installed client when an embedded program is installed in the client 10 of the user and communicates with the client 10 through the embedded program installed in the client 10.

If the registered user selects a widget registered in the second widget management unit 31, the individual widget registration unit 33 stores information on the selected widget in the client information DB 39, receives registration of an execution command for executing the widget from the user and stores the execution command. At this point, as for the execution command, a site name, a URL or an execution file name used by the user is registered as a primary execution command, and a search keyword is registered as a secondary execution command. In addition, an execution file name of a program executed in the client is registered as an execution command.

If a browser is displayed on the client 10 of the user, the second open page confirmation unit 34 selects an execution keyword related to the web site opened in the browser. As for the execution keyword, an English or Korean site name is selected as a primary execution keyword, and a search keyword is selected as a secondary execution keyword, and a most important word selected by analyzing morphemes of the web page in real-time may be selected as a tertiary execution keyword.

The second widget selection unit 35 compares the execution keyword of the client confirmed by the second open page confirmation unit 34 with execution commands of the widgets stored in the client information DB 39 and selects widgets having an execution command the same as the execution keyword.

If a program is executed in the client 10 of the user, the second execution program confirmation unit 36 confirms information on the executed program, compares the execution file name of the execution program with execution commands of the widgets stored in the client information DB 39, and selects widgets having the same execution command.

The second widget display unit 37 displays the widgets selected by the second widget selection unit 35 or the widgets selected by the second execution program confirmation unit 36 at one side of the client 10. At this point, the widgets displayed on the client 10 may be displayed together at one side of a partition by separating the browser into separate partitions, may be displayed in a toolbar, or may be displayed in the form of a gadget in a space other than the browser.

Figure 8:
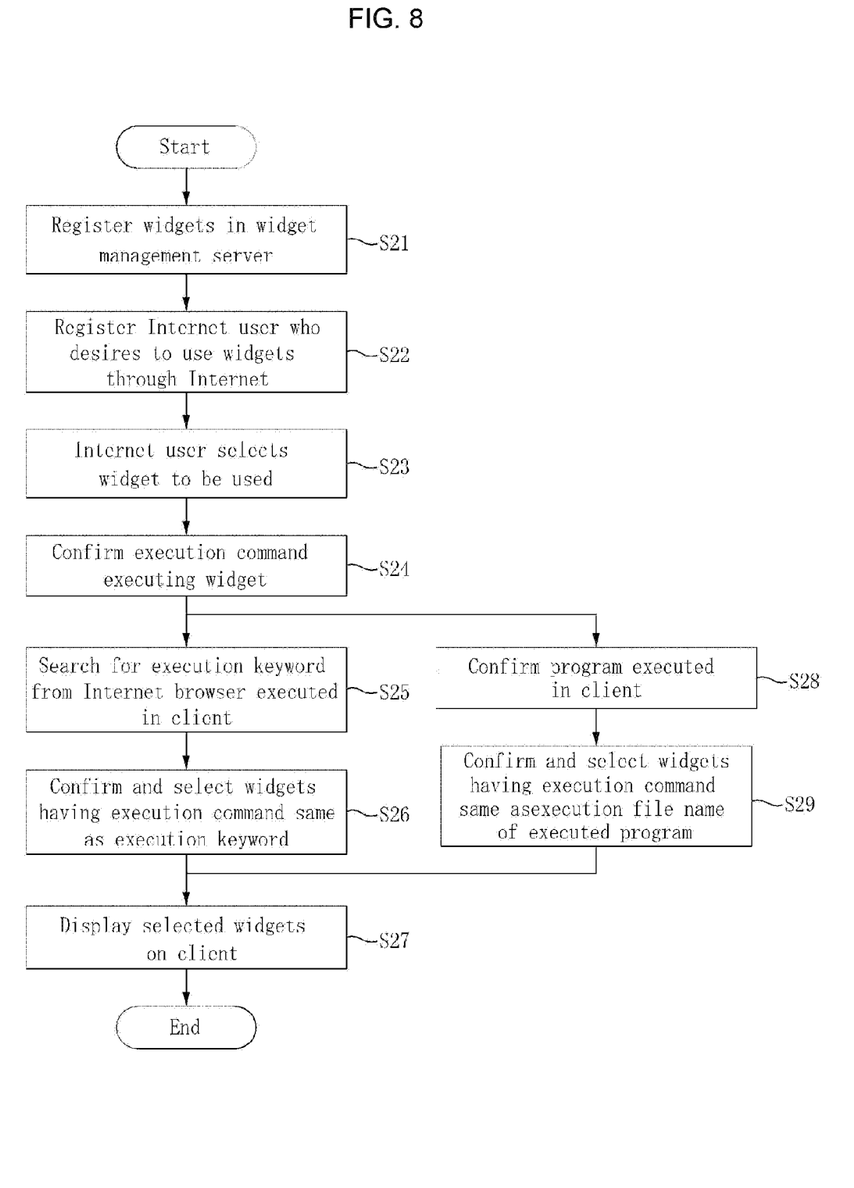
FIG. 8 is a flowchart illustrating a processing flow of a custom-tailored widget providing device installed in an external server and provided to a client according to a second embodiment of the present invention.

A processing flow of a custom-tailored widget providing device according to a second embodiment of the present invention will be described in detail with reference to FIG. 8.

First, the second widget management unit 31 of the widget providing device 20' is provided with various kinds of widgets provided to an Internet user, stores the widgets in the second widget information DB 38, and displays the widgets so that the Internet user may use the widgets (step S21). At this point, the widgets are preferably classified by the category item according to the field of using the widgets. The widgets registered in the second widget management unit 31 are basically execution commands for executing the widgets.

Then, the client management unit 32 of a management server receives registration of information on the client 10 of an Internet user who desires to use on-line various kinds of widgets registered on-line (step S22). It is preferable that information on the registered client 10 of the Internet user is automatically registered when an embedded program or the like is installed in the client 10 communicating with the server.

The individual widget registration unit 33 receives registration of a widget desired to be used from the user of the registered client and stores the widget in the client information DB 39 (step S23), and receives registration of an execution command for executing a modified, added or stored widget (step S24). At this point, as for the execution command, an execution file name of a program executed in the client 10 may be registered as an execution command.

Meanwhile, if a browser is executed in the client 10 of the user, the second open page confirmation unit 34 searches for an execution keyword by analyzing contents of an executed web page (step S13). For example, as for the execution keyword, an English or Korean site name is selected as a primary execution keyword, and a search keyword is selected as a secondary execution keyword, and, in addition, a most important word selected by analyzing morphemes of the web page in real-time may be selected as a tertiary execution keyword.

If the execution keyword of the web page displayed on the client 10 is selected, the second widget selection unit 35 selects widgets having an execution command corresponding to the keyword (step S26). The second widget display unit 37 displays the widgets having the same keyword registered as an execution command at one side of the client 10 (step S27). The widgets displayed on the client 10 may be displayed together at one side of a partition by separating the browser into separate partitions, or may be displayed in a toolbar, or may be displayed in a space other than the browser.

Meanwhile, if a specific program is executed in the client 10 of the user (step S28), the second execution program confirmation unit 36 compares the execution file name of the execution program with execution commands of the stored widgets and selects matching widgets (step S29). For example, if the program executed in the client 10 is a household account book program, a price comparison widget, a calculator widget, a notepad widget and the like for which the execution file name of the household account book program is registered as an execution command are selected.

The widgets selected by the second execution program confirmation unit 36 are displayed at one side of the client 10 through the second widget display unit 37 (step S29). At this point, the widgets displayed on the client 10 are preferably displayed in a space other than the browser.

The custom-tailored widget providing device of the present invention is advantageous in that if a web page is displayed on a wired or wireless client such as a cellular phone, a smart phone, a tablet PC, a computer, a TV or the like, widgets related to the displayed web page are output together so that a user may use the widgets.

Furthermore, the present invention is advantageous in that if a program is executed in a client, widgets related to the program are output together so that a user may use the widgets.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A custom-tailored widget providing device installed in a client, the device comprising:

a first widget management unit for receiving registration of information on various kinds of widgets and storing and managing the widget information;

a first execution command registration unit for registering execution commands for executing the widgets stored through the first widget management unit;

a first open page confirmation unit for selecting, if a browser is displayed on the client of a user, an execution keyword related to a web site opened in the browser;

a first widget selection unit for selecting, if the execution keyword of the client is confirmed by the first open page confirmation unit, widgets having an execution command the same as the execution keyword by comparing the execution keyword of the client with the execution commands of the stored widgets; and a first widget display unit for displaying the widgets selected by the first widget selection unit at one side of the client wherein as for the execution commands, a site name, a URL or an execution file name is registered as a primary execution command, and a search keyword is registered as a secondary execution command, wherein as for the execution keyword of the first open page confirmation unit, an English or Korean site name or a URL is selected as a primary execution keyword, and a search keyword is selected as a secondary execution keyword, and a word selected based on its importance by analyzing morphemes of a web page in real-time is selected as a tertiary execution keyword.

2. The device according to claim 1, wherein the stored widget information is registered by a category item classified by a keyword according to a field of using the widgets.

3. The device according to claim 1, wherein the first widget display unit displays the selected widgets together at one side of a partition by separating the browser into separate partitions or displays the widgets in a toolbar or in a space other than the browser.

4. The device according to claim 1, further comprising a first execution program confirmation unit for confirming, if a program is executed in the client of the user, information on the executed program and selecting widgets having an execution command the same as an execution file name of the execution program, wherein the first widget display unit displays the widgets selected by the first execution program confirmation unit at one side of the client.

5. A custom-tailored widget providing device stored in an external server and displaying widgets on a client while communicating with the client, the device comprising:

a second widget management unit for receiving registration of information on various kinds of widgets including an execution command and storing and managing the widget information;

a client management unit for receiving registration of information on a user who desires to use the various kinds of widgets registered in the second widget management unit;

an individual widget registration unit for receiving, if the registered user selects a widget registered in the second widget management unit, registration of information on the selected widget;

a second open page confirmation unit for selecting, if a browser is displayed on the client of the user, an execution keyword related to a web site opened in the web browser;

a second widget selection unit for selecting, if the execution keyword of the client is confirmed by the second open page confirmation unit, widgets having an execution command the same as the execution keyword by comparing the execution keyword of the client with execution commands of the stored widgets; and a second widget display unit for displaying the widgets selected by the second widget selection unit at one side of the client wherein the individual widget registration unit receives registration of an execution command from the user, wherein as for the execution commands, a site name, a URL or an execution file name is registered as a primary execution command, and a search keyword is registered as a secondary execution command, and wherein as for the execution keyword of the second open page confirmation unit, an English or Korean site name or a URL is selected as a primary execution keyword, and a search keyword is selected as a secondary execution keyword, and a word selected based on its importance by analyzing morphemes of a web page in real-time is selected as a tertiary execution keyword.

6. The device according to claim 5, wherein the client management unit automatically registers information on the installed client when an embedded program is installed in the client of the user, and the embedded program installed in the client communicates with the server.

7. The device according to claim 5, wherein the second widget display unit displays the selected widgets together at one side of a partition by separating the browser into separate partitions or displays the widgets in a toolbar or in a space other than the browser.

8. The device according to claim 5, further comprising a second execution program confirmation unit for confirming, if a program is executed in the client of the user, information on the executed program and selecting widgets having an execution command the same as an execution file name of the execution program, wherein the second widget display unit displays the widgets selected by the second execution program confirmation unit at one side of the client.

* * * * *